(12) United States Patent
Lai et al.

(10) Patent No.: US 6,324,286 B1
(45) Date of Patent: Nov. 27, 2001

(54) DES CIPHER PROCESSOR FOR FULL DUPLEX INTERLEAVING ENCRYPTION/ DECRYPTION SERVICE

(75) Inventors: Yi-Sern Lai, Tainan Hsien; I-Yao Chuang, Taipei; Bor-Wen Chiou, Tau-Yuan Hsien; Chin-Ning Yang, Shin-Chu, all of (TW)

(73) Assignee: Industrial Technology Research Institute, Chu-Tuan Chen (TW)

( * ) Notice: Subject to any disclaimer, the term of this patent is extended or adjusted under 35 U.S.C. 154(b) by 0 days.

(21) Appl. No.: 09/166,671

(22) Filed: Oct. 5, 1998

(30) Foreign Application Priority Data

Jun. 17, 1998 (TW) ................................................ 87109613

(51) Int. Cl.[7] ...................................................... H04L 9/06
(52) U.S. Cl. .............................................. 380/29; 380/37
(58) Field of Search ........................................ 380/29, 37

(56) References Cited

U.S. PATENT DOCUMENTS

| | | | |
|---|---|---|---|
| 3,958,081 | 5/1976 | Ehrsam et al. | 380/29 |
| 4,195,200 | * 3/1980 | Feistel | 380/37 |
| 4,229,818 | 10/1980 | Matyas et al. | 380/37 |
| 4,262,358 | 4/1981 | Marino, Jr. | 714/805 |
| 4,543,646 | 9/1985 | Ambrosius, III et al. | 380/29 |
| 4,731,843 | 3/1988 | Holmquist | 380/29 |
| 5,003,597 | 3/1991 | Merkle | 380/37 |
| 5,317,638 | 5/1994 | Kao et al. | 380/29 |
| 5,404,402 | * 4/1995 | Sprunk | 713/189 |
| 5,513,262 | * 4/1996 | van Rumpt et al. | 380/29 |
| 5,631,960 | 5/1997 | Likens et al. | 380/2 |
| 5,671,284 | * 9/1997 | Buer | 380/29 |
| 5,835,599 | * 11/1998 | Buer | 380/29 |

OTHER PUBLICATIONS

"Announcing the Standard for DES Modes of Operation", *Federal Information Processing Standards Publication*, Computer Systems Laboratory, National Institute of Standards and Technology, vol. 81, Dec. 1980.

"Data Encryption Standard (DES)", *Federal Information Processing Standards Publication*, Computer Systems Laboratory, National Institute of Standards and Technology, vol. 46, No. 2, Dec. 1993.

* cited by examiner

*Primary Examiner*—Gail Hayes
*Assistant Examiner*—Anthony DiLorenzo
(74) *Attorney, Agent, or Firm*—Ladas & Parry (57) ABSTRACT

A full duplex DES cipher processor (DCP) supports to execute sixteen rounds of data encryption standard (DES) operation in four encryption modes and four decryption modes, namely: Electronic Code Book (ECB) mode, Cipher Block Chaining (CBC) mode, Cipher Feedback (CFB) mode, and Output Feedback (OFB) mode for both encryption and decryption. A DCP is composed of an I/O unit, an IV/key storage unit, a control unit, and an algorithm unit. The algorithm unit is used to encrypt/decrypt the incoming text message. The algorithm unit having a crypto engine allows encryption and decryption performed alternately, by sharing the same crypto engine. Since for crypto applications in communication services like T1, E1, V.35, the algorithm unit operation time is much shorter than the data I/O time; in other word, the algorithm unit is in the idle state mostly. The full duplex operation is achieved by storing the interim results of the DES encryption operation in a cipher text buffer (CTB) and the decryption results in a plain text buffer (PTB), where the CTB and PTB are in the crypto engine. The full duplex DCP has two ports, one for encrypting and the other for decrypting. In addition, the DCP can also be used for single port simplex or dual port simplex applications.

6 Claims, 11 Drawing Sheets

DES CIPHER PROCESSOR FOR FULL DUPLEX INTERLEAVING ENCRYPTION/ DECRYPTION SERVICE

BACKGROUND OF THE INVENTION

1. Field of the Invention

The present invention relates to an encryption-decryption processor, particularly to a DES cipher processor (DCP) for executing 16 rounds of data encryption standard (DES) operations in four encryption modes and four decryption modes, namely: Electronic Code Book (ECB) mode, Cipher BlockChaining (CBC) mode, Cipher Feedback (CFB) mode and Output Feedback (OFB) mode for both encryption and decryption. DES stands for Data Encryption Standard, an encryption and decryption standard adopted by the United States Government Details concerning DES can be found in FIPS (Federal Information Processing) Publication 46-2 and 74 published by the National Institute of Standards and Technology.

2. Description of the Related Art

When encrypted communication is undertaken using high speed communication equipment, such as full duplex E1, T1, and V.35 services, among others, two DCPs will be needed in an encryption-decryption module: one DCP for encryption, and another for decryption.

Figure 1:
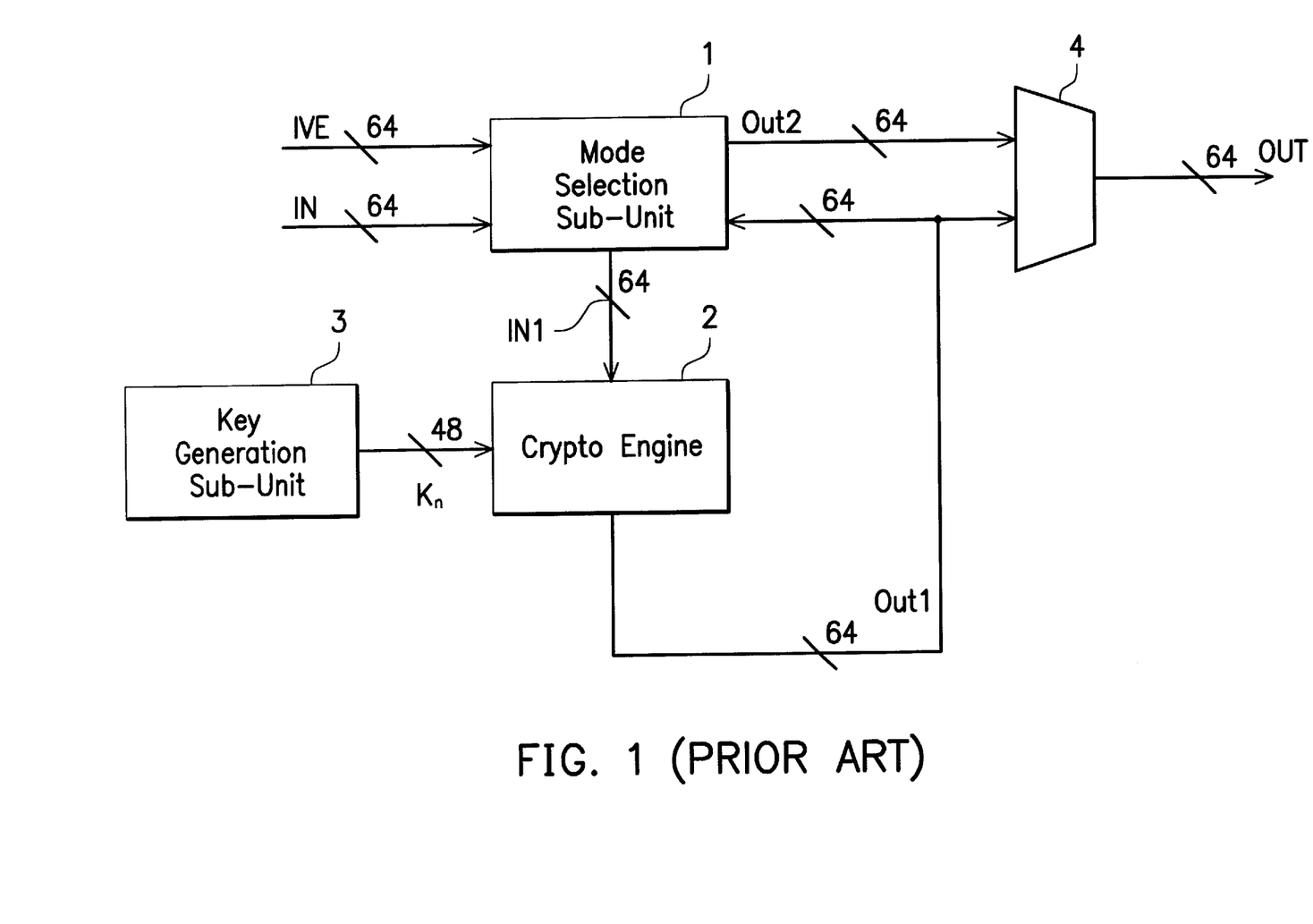
FIG. 1 (Prior Art) is a block diagram illustrating the algorithm unit of a conventional DES cipher processor.

A DCP is composed of a data I/O unit, an IV/key storage unit, a control unit, and an algorithm unit. The algorithm unit is used to encrypt/decrypt the incoming text message. FIG. 1 (Prior Art) is a block diagram illustrating the algorithm unit of a conventional DES cipher processor. The crypto engine 2 receives a modified input IN1 from the mode selection sub-unit 1 and encrypts it according to subkeys provided by the key generation sub-unit 3 to obtain an encrypted text OUT1. The mode selection sub-unit 1 processes an input IN to be encrypted, an initial vector for encryption IVE corresponding to a selected encryption mode, such as CBC mode, and the encrypted text OUT1 of the crypto engine 2 to obtain the modified input IN1 or the encrypted text OUT2. The multiplexor 4 then selects OUT1 or OUT2 as an encrypted output OUT of the algorithm unit according to the selected encryption mode. In this case, only one buffer (not shown) is needed in the crypto engine 2 to store intermediate encrypted texts during the sixteen rounds of DES operations. The results of the sixteenth round of DES operation is therefore also be stored in this buffer.

Figure 2A:
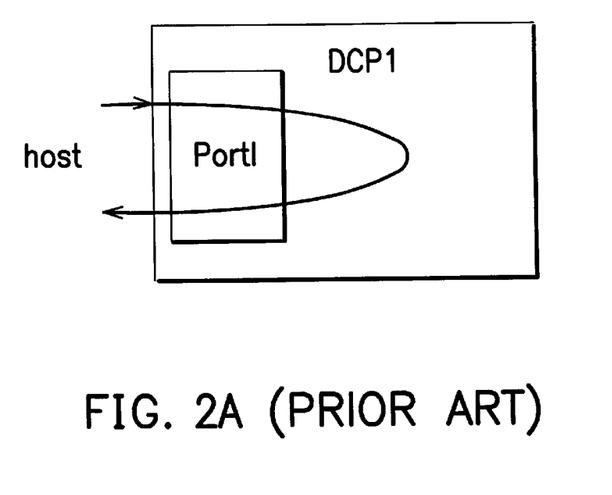
FIGS. 2A and 2B (Prior Art) are schematic diagrams illustrating the data path of conventional single-port and dual-port DES cipher processor.
Figure 2B:
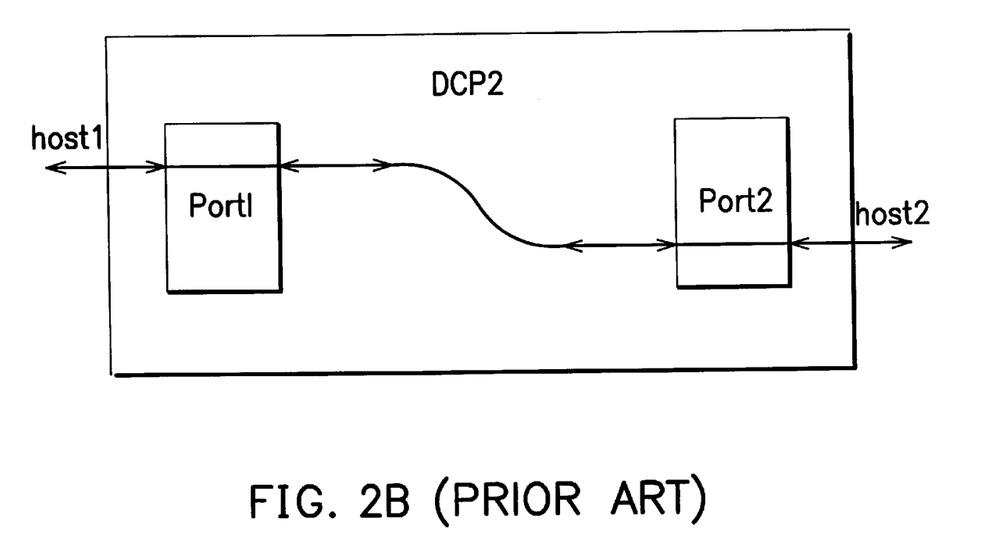

FIGS. 2A and 2B (Prior Art) illustrate the data path of a single-port simplex encryption processor and a dual port simplex encryption processor, respectively. The input and the output of the single-port encryption processor are delivered through the same data port, that is, the data to be encrypted/decrypted are inputted to the DES cipher processor DCP1 through data port Port1, and the encrypted outcome thus obtained is outputted from the same data port Port1. The input and the output of the dual-port simplex encryption processor DES cipher processor DCP2 are delivered through different data ports, that is, the data to be encrypted/decrypted are inputted to the DES cipher processor DCP2 through data port Port1, and the encrypted/ decrypted outcome thus obtained is outputted from another data port Port2, and vice versa.

A decryption processor for executing sixteen rounds of DES operations has a structure similar to the encryption processor described above. The initial vector for encryption IVE is replaced by the initial vector for decryption IVD and the key generation sub-unit 3 rearranges the subkeys to allow the original crypto engine to perform decryption. The IVE and IVD are used for the CBC mode, CFB mode, and OFB mode only and are only employed at the beginning of the processing of the text message.

A DCP that dissects a text message into various blocks, each of which is encrypted or decrypted according to prescribed sequence, can perform a decryption operation only after the whole previous plain text message is completely encrypted, or can perform an encryption operation only after the whole previous cipher text message is decrypted. For the CBC mode, CFB mode, or OFB mode, the values of the sixteen-round DES encryption operation, stored in the sole data buffer, have to be fed back to the mode selection sub-unit to interact with the next incoming block of plain text message, namely, the values of sixteen-round DES encryption operation cannot be used to interact the next block of incoming ciphered text message and vice versa. Also, the algorithm unit has a long wait between the operation of two blocks of text message since I/O port is the bottleneck of the throughput. Therefore, the idle time for the algorithm unit can be much longer than the time required for the actual encryption or decryption operation.

Consequently, an encryption-decryption module for full duplex operation needs either two DCPs or two crypto engines, one for encryption and the other for decryption. This results in an increase in cost and required space. Alternatively, the mode selection sub-unit 1 and the key generation sub-unit (as shown in FIG. 1) are modified to enable the crypto engine 2 to perform DES in four encryption modes and four decryption modes.

SUMMARY OF THE INVENTION

Accordingly, an object of the present invention is to provide a full duplex algorithm unit, which can execute DES operations in four encryption modes and four decryption modes while reducing the required space and cost.

Another object of the present invention is to provide a crypto engine for executing DES operations by providing two data buffers for storing the interim data for data encryption and data decryption, respectively, in order to perform the encryption process and the decryption process simultaneously, thereby enhancing the efficiency of the algorithm unit by reducing the idle time.

To realize the above and other objects, the present invention provides a algorithm unit for executing the DES modes which comprises a key generation sub-unit, a crypto engine, a mode selection sub-unit, and an output multiplexor. The key generation sub-unit generates subkeys for DES operations. The crypto engine includes an input buffer for registering the data to be encrypted/decrypted and an n-round DES device for performing sixteen-round DES operation according to the aforementioned subkeys to obtain a corresponding cipher text/plain text. The n-round DES device can be a two-round, four-round, eight-round, or sixteen-round DES device. The number of the subkeys for the crypto engine depends on the n of n-round DES device. For example, a two-round DES device needs two corresponding subkeys, and a four-round DES device needs four corresponding subkeys. Further, the crypto engine also includes a cipher text buffer (CTB) and a plain text buffer (PTB) for registering the ciphered text and the plain text obtained from the n-round DES device, respectively. The mode selection sub-unit sequentially processes an input to be encrypted/ decrypted and the cipher text/plain text of the cipher/plain text buffer according to a selected encryption/decryption mode to obtain a encrypted/decrypted output for the next encryption/decryption. The output multiplexor then selects the output of the mode selection sub-unit or the ciphered text/plain text of the CTB/PTB.

Moreover, the DCP of the present invention may also include an encryption data port, a decryption data port, an input port de-multiplexor and an output port multiplexor, wherein the encrypting port processes the plain text message and the decrypting port processes the ciphered text message.

BRIEF DESCRIPTION OF THE DRAWINGS

Further objects, features and advantages of the present invention will become apparent from the following detailed description of a preferred embodiment of the invention with reference to the accompanying drawings.

DETAILED DESCRIPTION OF THE PREFERRED EMBODIMENT

Figure 3:
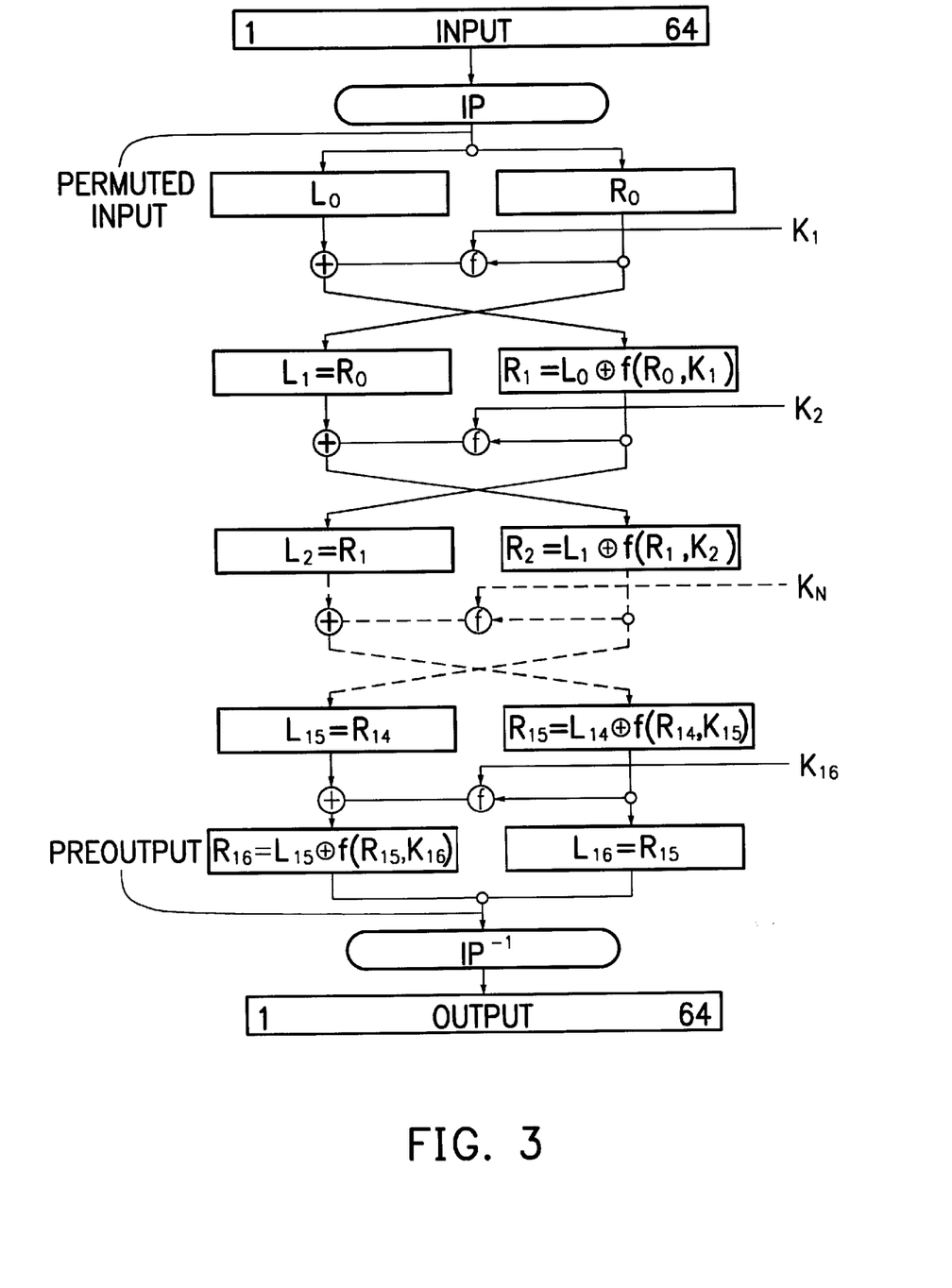
FIG. 3 is a flowchart illustrating how the encrypted text is obtained according to the DES algorithm.

FIG. 3 is a flowchart illustrating how the encrypted text is generated according to the DES operations. The 64 bits of the input block INPUT to be encrypted are first subjected to the following permutation, called the initial permutation IP, as represented in Table 1:

TABLE 1

| 58 | 50 | 42 | 34 | 26 | 18 | 10 | 2 |
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9  | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 |

The permuted input has bit 58 of the input block INPUT as its first bit, bit 50 as its second bit, and so on with bit 7 as its last bit.

The permuted input block is then the input to a complex key-dependent computation which is described below. The output of that computation, called the preoutput, is then subjected to permutation $IP^{-1}$ which is the inverse of the initial permutation IP. The permutation $IP^{-1}$ is represented in Table 2:

TABLE 2

| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9  | 49 | 17 | 57 | 25 |

As such, the encryted output has bit 40 of the preoutput block as its first bit, bit 8 as its second bit, and so on, with bit 25 of the preoutput block being the last bit of the encrypted output.

Now, the sixteen rounds of DES encryption operations will be described.

First, assume that the 64 bits of the input block consist of a 32 bit block L followed by a 32 bit block R. Using this notation, the input block is LR. Let $K_1$ be a block of 48 bits chosen from the 64-bit key KEY for the first round of DES operations. Then the output block L'R' with input block LR is defined as:

$$L'=R$$

$$R'=L \oplus f(R, K_1)$$

Where $\oplus$ denotes a bit-by-bit exclusive-OR operation, and f denotes a predetermined function used in the sixteen rounds of DES encryption operations.

Likewise, other-round encryption operations can be sequentially defined as:

$$L_n'=R_{n-1}$$

$$R_n'=L_{n-1} \oplus f(R_{n-1}, K_n)$$

The result of the $16^{th}$ round PREOUTPUT is operated on with the inverse permutation $IP^{-1}$ before the final encrypted result is outputted, as mentioned above.

The sixteen rounds of DES decryption operations are similar to the just-described sixteen rounds of DES encryption operations. The initial permutation used to generate the preoutput block for the sixteen rounds of DES decryption operations is the reverse of the initial permutation IP used for the input block of the sixteen rounds of DES encryption operations. Thus the permutation used on the input block to be decrypted corresponds to IP-1 described above with reference to Table II. The sixteen rounds of DES decryption operations can be defined as:

$$R_{n-1}=L_n$$

$$L_{n-1}=R_n \oplus f(L_n, K_n)$$

Figure 4:
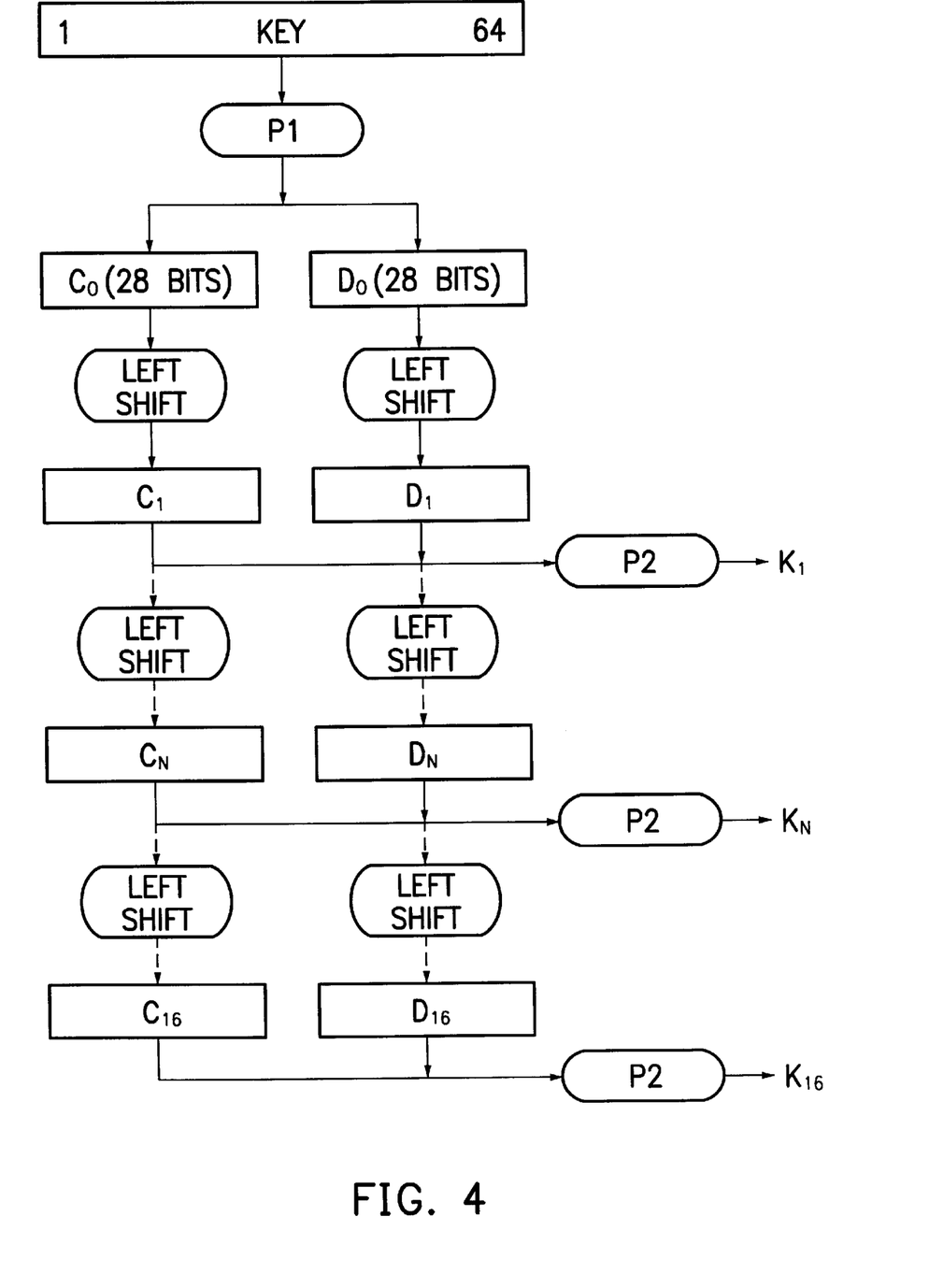
FIG. 4 is a flowchart illustrating how the subkeys are generated according to the DES algorithm.

FIG. 4 is a flowchart illustrating how the subkeys are generated according to the DES algorithm.

To complete the definition of the key $K_n$, it is necessary to describe two permuted choices and the schedule of left shifts. One bit in each 8-bit byte of the key KEY may be utilized for error detection in key generation, distribution and storage. For example, bits 8, 16, . . . , 64 are for use in assuring that each byte is of odd parity. The first permuted choice P1 is then defined as Table 3, which is divided into two parts. The first part determines how the bits of $C_0$ are chosen, and the second part determines how the bits of $D_0$ are chosen. The bits of KEY are numbered 1 through 64. The bits of $C_0$ are respectively bits 57, 49, . . . , 44 and 36 of the key KEY, while the bits of $D_0$ are defined as bits 63, 55, 47, . . . , 12 and 4 of the key KEY.

TABLE 3

| 57 | 49 | 41 | 33 | 25 | 17 | 9  |
|----|----|----|----|----|----|----|
| 1  | 58 | 50 | 42 | 34 | 26 | 18 |
| 10 | 2  | 59 | 51 | 43 | 35 | 27 |
| 19 | 11 | 3  | 60 | 52 | 44 | 36 |
| 63 | 55 | 47 | 39 | 31 | 23 | 15 |
| 7  | 62 | 54 | 46 | 38 | 30 | 22 |
| 14 | 6  | 61 | 53 | 45 | 37 | 29 |
| 21 | 13 | 5  | 28 | 20 | 12 | 4  |

With $C_0$ and $D_0$ defined, $C_n$ and $D_n$ are obtained from the blocks $C_{n-1}$ and $D_{n-1}$, respectively, for n=1,2, . . . ,16. That is accomplished by adhering to the following schedule of left shifts of the individual blocks:

$$C_n = \text{left\_shift}(C_{n-1})$$

$$D_n = \text{left\_shift}(D_{n-1})$$

In all cases, by a single left shift is meant a rotation of the bits one place to the left, so that after one left shift the bits in the 28 positions are the bits that were previously in positions 2, 3, . . . , 28, 1. The second permuted choice (P2) is determined as Table 4. As shown in the Figure, the relationship between keys $K_n$ and $C_n$ can be representd as:

$$K_n = P2(C_n D_n)$$

That is, the first bit of the key $K_n$ is the $14^{th}$ bit of $C_n D_n$, the second bit the 17th, and so on with the 47th bit the 29th, and the 48th the 32nd.

TABLE 4

| 14 | 17 | 11 | 24 | 1  | 5  |
|----|----|----|----|----|----|
| 3  | 28 | 15 | 6  | 21 | 10 |
| 23 | 19 | 12 | 4  | 26 | 8  |
| 16 | 7  | 27 | 20 | 13 | 2  |
| 41 | 52 | 31 | 37 | 47 | 55 |
| 30 | 40 | 51 | 45 | 33 | 48 |
| 44 | 49 | 39 | 56 | 34 | 53 |
| 46 | 42 | 50 | 36 | 29 | 32 |

Figure 5:
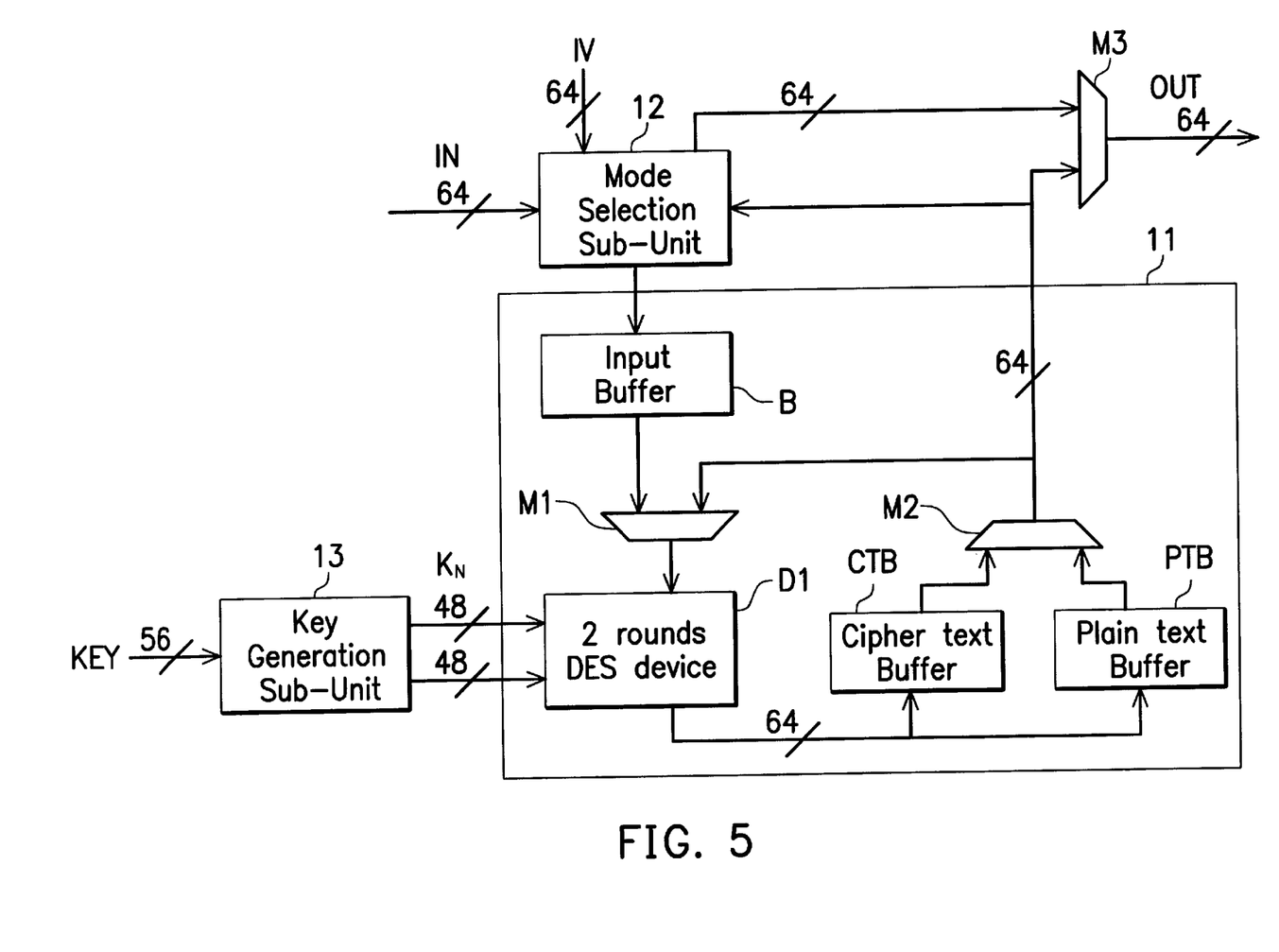
FIG. 5 is a block diagram illustrating the algorithm unit of an full duplex DES cipher processor for executing four DES encryption modes and four DES decryption modes according to the present invention.

FIG. 5 is a block diagram of the algorithm unit for executing DES operations in accordance with to the present invention. In this case, the crypto engine 11 uses two-round DES device, and the sixteen-round DES operation is completed after running through the crypto engine 11 eight time. The crypto engine 11 includes an input buffer B, a two-round DES device D1 for performing two rounds of DES operations, a cipher text buffer CTB, a plain text buffer PTB and nultiplexors M1, M2. The input buffer B stores the data to be encrypted/decrypted. The multiplexor M1 supplies, the data in the input buffer B or the data stored in the CTB, PTB for the next round DES operation. The two-round DES device D1 performs two-round DES encryption/decryption operations according to the subkeys obtained from the key generation sub-unit 13. The key generation sub-unit 13 generates the subkeys for the 16-round DES operations with reference to the key KEY. The interim encryption output and the interim decryption output as well as the output of the sixteenth round DES operation of two-round DES device D1 are respectively stored in the cipher text buffer CTB and plain text buffer PTB. The mode selection sub-unit 12 processes the input block IN, the initial vector IV (IVE or IVD) and the cipher text/plain text obtained from previous encryption-decryption according to the selected encryption/decryption mode and supplies the encrypted/decrypted output to the input buffer B of the crypto engine 11. The multiplexor M3 then selects the cipher text/plain text of the mode selection sub-unit 12, or through the multiplexor M2 the selection of the CTB, PTB, as the output of the algorithm unit.

In a conventional DCP that dissects a text message into various blocks, each of which is encrypted or decrypted according to prescribed sequence, can perform a decryption operation only after the whole previous plain text message is completely encrypted, or can perform an encryption operation only after the previous decryption operated is completed. For the CBC mode, CFB mode, or OFB mode, the values of the sixteen-round DES encryption operation, stored in the sole data buffer, have to be fed back to the mode selection sub-unit to interact with the next incoming block of plain text message, namely, the values of sixteen-round DES encryption operation cannot be used to interact the next block of incoming ciphered text message and vice versa. In addition, the speed of data input/output is considerably slower than the speed of the crypto engine, there will be a long idle period for the DES processor which is highly inefficient. Since the crypto engine is not fully utilized in many applications, it can be used to encrypt and decrypt different data sources at the same time, in an interleaved fashion by providing additional buffers to store partially processed (or interim) data. In the present invention, an extra text buffer is provided so that the interim encryption output and the interim decryption output can be stored in a respective buffer during the encryption and decryption process and the alternate processing of the two steps. Consequently, one mode may proceed without waiting until the completion of the data processing of a previous message. As shown in FIG. 5, the data to be encrypted and the data to be decrypted can be inputted to the mode selection sub-unit 12 through the data bus IN, and use a respective data buffer (CTB or PTB) for storing the interim data in each encryption and decryption process. Meanwhile, a key generation sub-unit 13 provides the necessary subkeys in accordance with the time sequence of encryption and decryption processes for further processing by the crypto engine 11. When the sixteen rounds of DES operations are completed, the multiplexor M3 then selects the outcome of the operation or the cipher text/plain text in the cipher text buffer CTB/plain text buffer PTB. The output data of the multiplexor needs a further inverse of permutation $IP^{-1}$ (not shown) to be complete.

Figure 6:
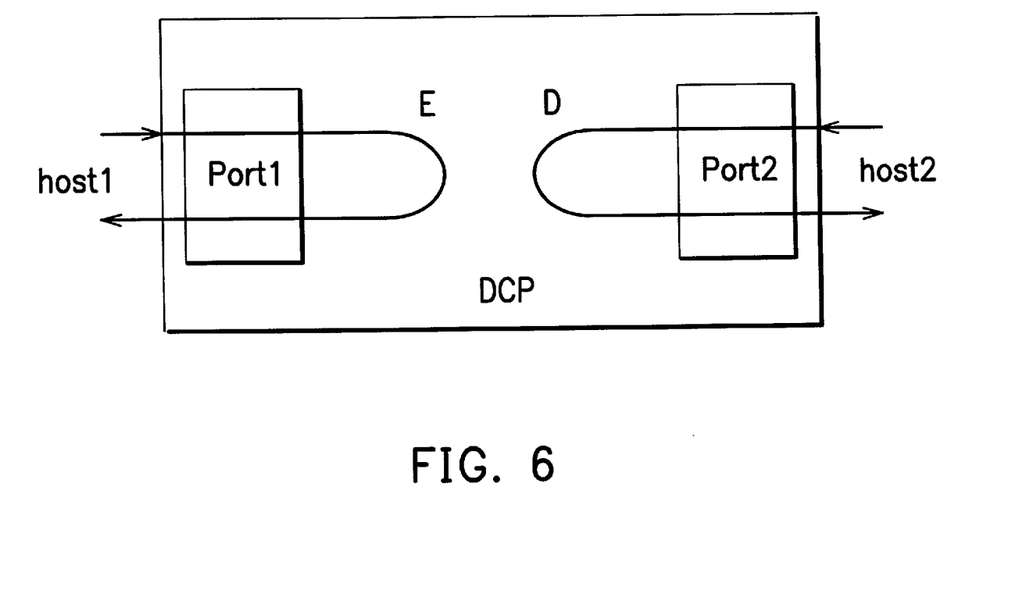
FIG. 6 is a schematic diagram illustrating the data path of a full duplex DES cipher processor according to the present invention.

Turning to FIG. 6, a schematic diagram illustrating the data path of the full duplex DES cipher processor of the present invention is depicted. The DES cipher processor comprises two ports port1, port2 for receiving the input to be encrypted and the input to be encrypted, respectively, and for outputting the encrypted output and the decrypted output, respectively. In this manner, the utilization efficiency for the entire DES cipher processor can be doubled as compared with the conventional counterparts.

Next, it will be described how the mode selection sub-unit 12 controls the data path according to various encryption/decryption modes.

Next, it will be described how the mode selection unit 12 controls the data path according to various encryption/decryption modes.

Figure 7A:
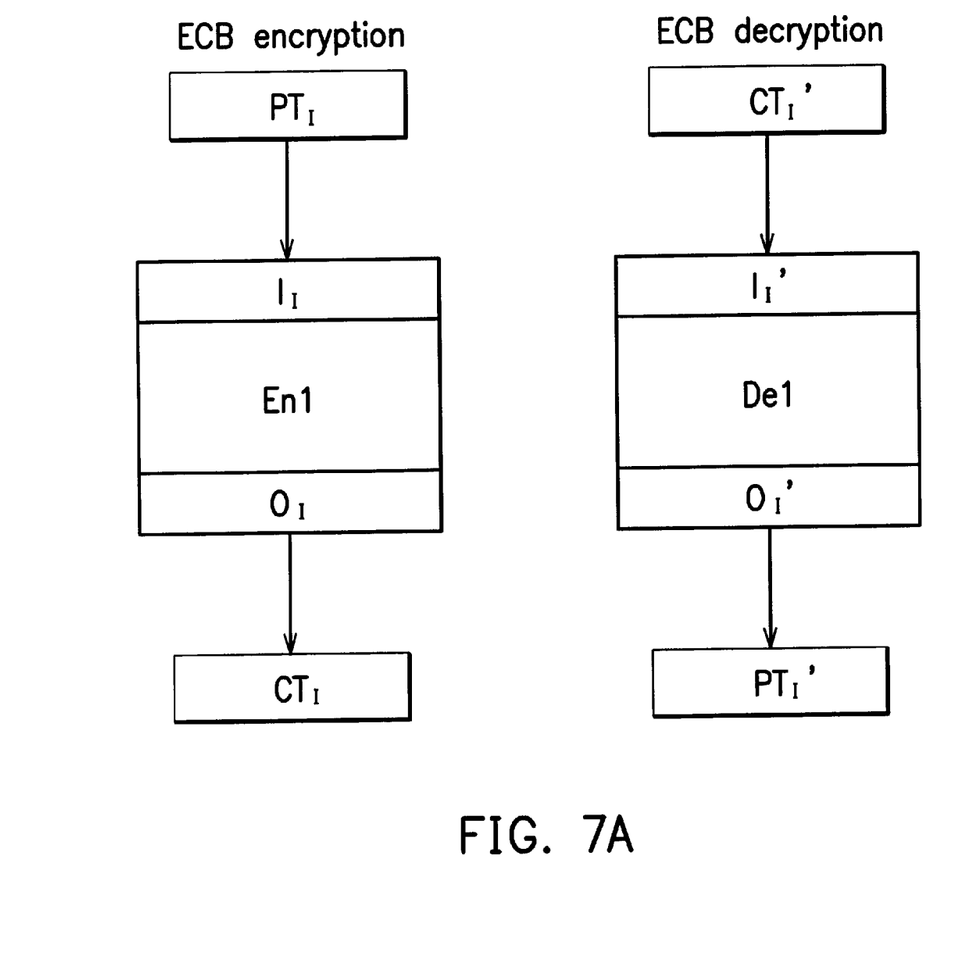
FIG. 7A is a flowchart illustrating the ECB mode of the DES operation.

FIG. 7A is a flowchart illustrating the ECB mode of the DES operation. During the encryption process in ECB mode, the plain text data $PT_I$ directly serves as the input block $I_I$ of the crypto engine 11 for the operation En1 so as to obtain an output block $O_I$ as the cipher text data $CT_I$. During the decryption process in ECB mode, the cipher text data $PT_I$ directly serves as the input block $I_I'$ of the encryption-decryption engine 11 for the operation De1 so as to obtain an output block $O_I'$ as the cipher text data $CT_I'$.

Figure 7B:
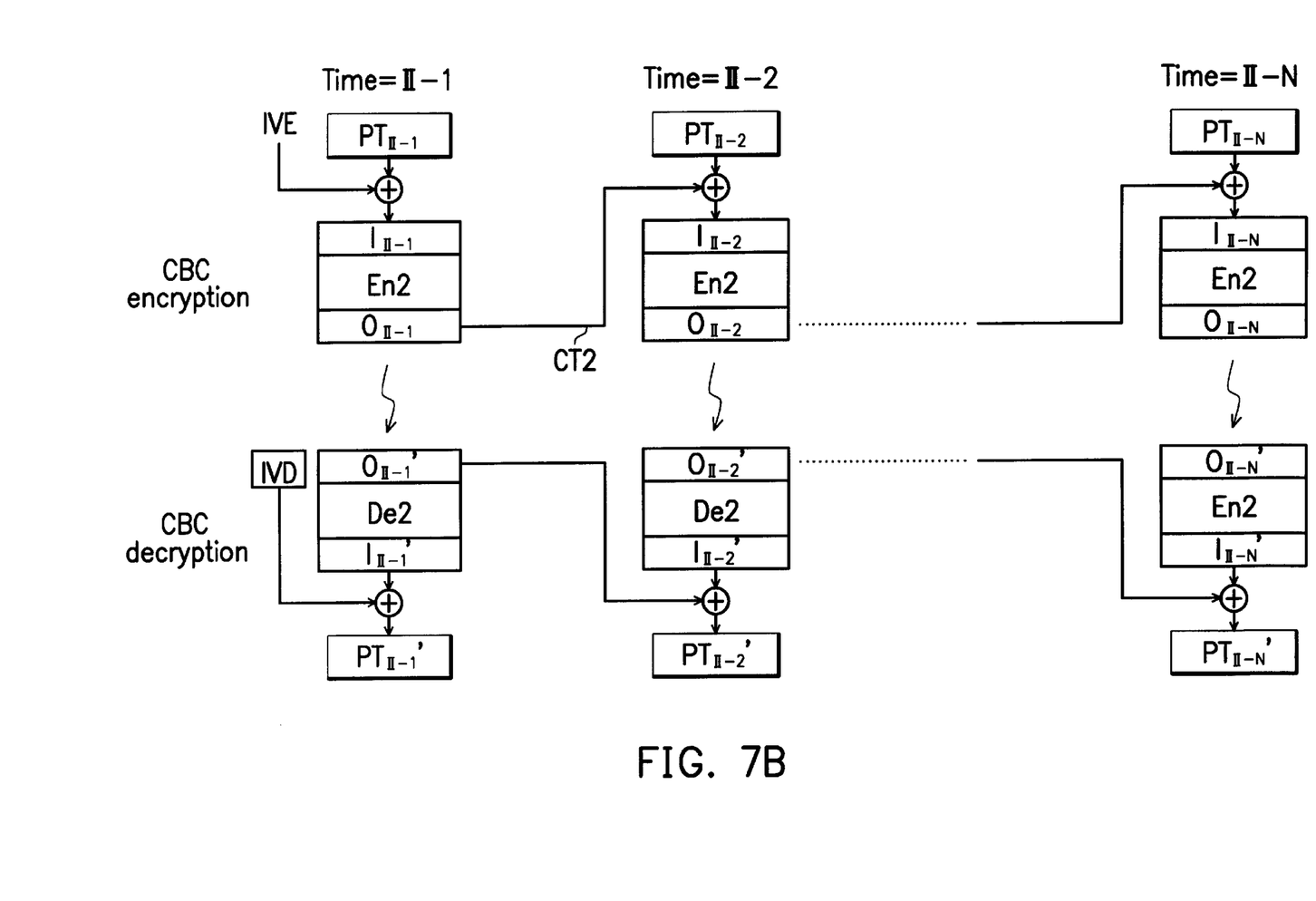
FIG. 7B is a flowchart illustrating the CBC mode of the DES operation.

FIG. 7B is a flowchart illustrating the CBC mode of the DES operation. During the encryption process in CBC mode, the plain text data $PT_{II-1}$ and the encrypted initial vector IVE first performs an exclusive-OR $\oplus$ operation to serve as the input block $I_{II-1}$ for the operation En2, so as to obtain an output block $O_{II-1}$ as the cipher text data $CT_{II-1}$. The next plain text data $PT_{II-2}$ then performs the exclusive-OR operation of the output block $I_{II-1}$ for the encryption operation En2, so as to obtain an output block $O_{II-1}$, and so forth. During the decryption process in CBC mode, the cipher text data $O_{II-1}'$ directly performs the decryption De2, so as to obtain an output block $I_{II-1}'$ and the initial vector for decryption IVD exclusive-OR operation as the plain text data $PT_{II-1}'$. The cipher text data of the next block $O_{II-2}'$ directly performs the decryption operation and obtains the plain text data $PT_{II-2}'$ of the next block after addition with the previous cipher text data $O_{II-1}'$.

Figure 7C:
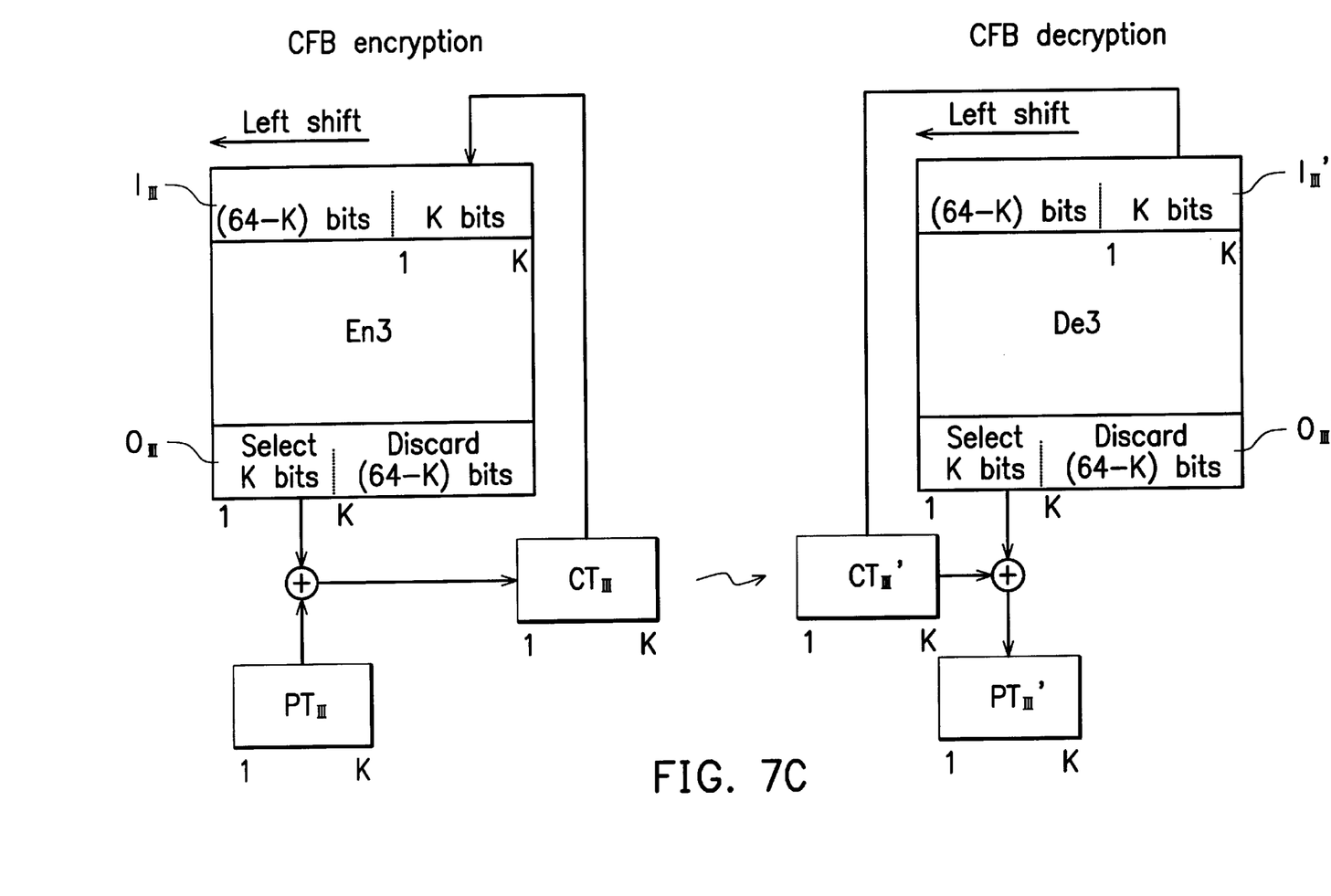
FIG. 7C is a flowchart illustrating the CFB mode of the DES operation.

FIG. 7C is a flowchart illustrating the CFB mode of the DES operation. During the encryption and the decryption processes, an initial vector IV of length L (not shown) is used. The IV is placed in the least significant bits of the DES input block with the unused bit set to "0's", ie., (I1, I2, ... , I64)=(0,0, ... , 0, IV1,IV2, ... , IVL). During the encryption process, the initial vector IV first makes a left shift of K bits and accepts the K-bit feedback of the previous cipher text data $CT_{III}'$ as the input block $I_{III}$, and undergoes the encryption operation En3 so as to obtain the output block $O_{III}$. The first K bits of the output block $O_{III}$ then perform the exclusive-OR operation with the K bits of the plain text, so as to obtain K bits of the cipher text data to be fed back to the last K bits of the input block. During the decryption process, the initial vector IV first makes a left shift of K bits and accepts the K-bit feedback of the previous cipher text data $CT_{III}'$ and undergoes the decryption operation De3 so as to obtain the output block $O_{III}'$, and takes the first K bits of the output block $O_{III}$ and the exclusive-OR of the previous cipher text data, so as to obtain the plain text data $PT_{III}'$.

Figure 7D:
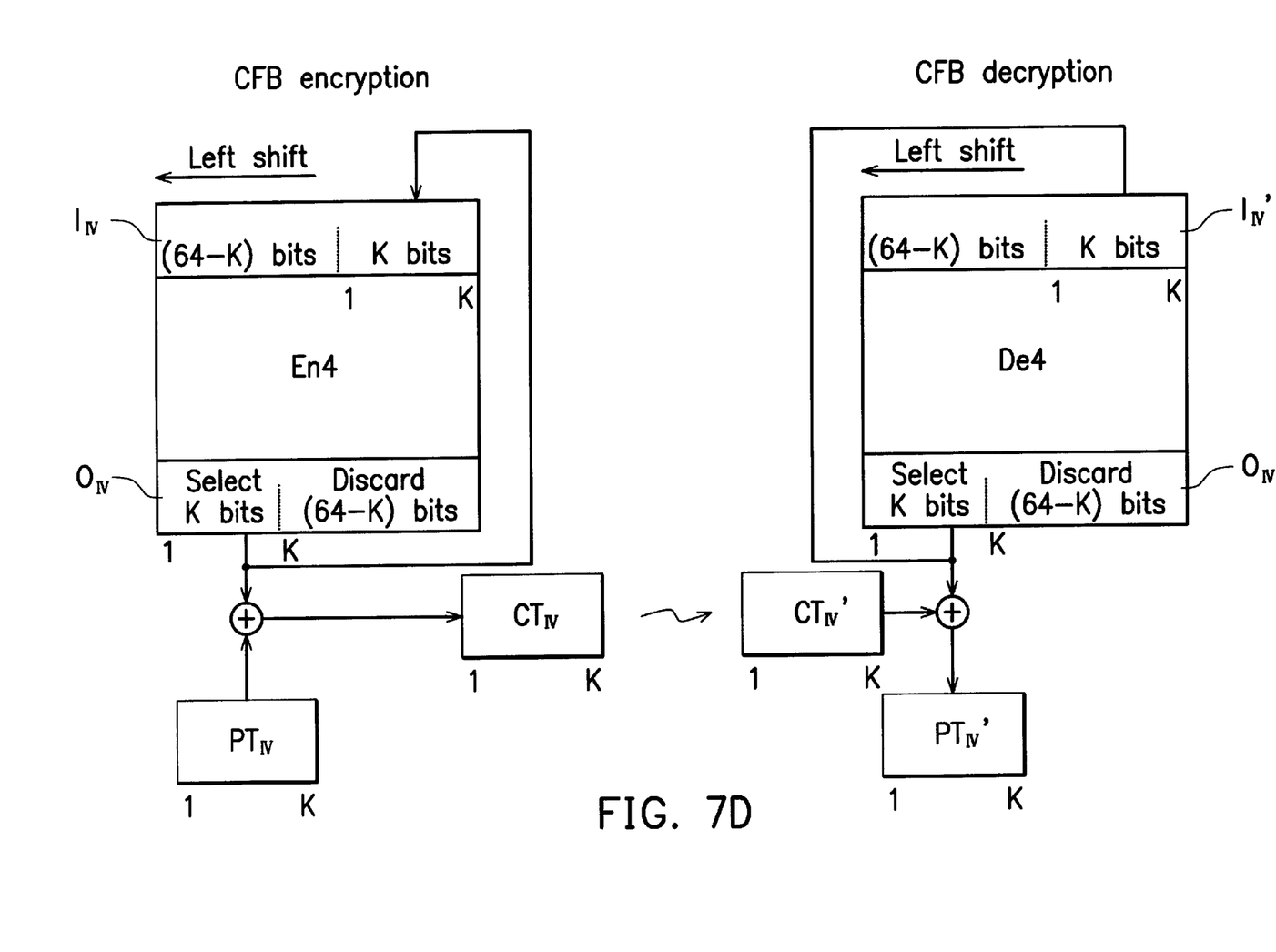
FIG. 7D is a flowchart illustrating the OFB mode of the DES operation.

FIG. 7D is a flowchart illustrating the OFB mode of the DES operation. Therein, most processes are similar to those in CFB mode except that the feedback of the previous cipher text data is replaced with the feedback of the output block. Therefore, the description is omitted.

As shown in FIG. 5, the subkeys $K_N$ needed during the sixteen rounds of encryption and decryption are obtained from the key generation sub-unit 13 using the method shown in FIG. 4. And the crypto engine 11 performs the sixteen rounds of encryption and decryption. In this embodiment, the n-round DES device D1 provided in the crypto engine 11 is a two-round DES device, so the crypto engine 11 has to process the input data stored in the input buffer B for eight times to complete sixteen round DES operation. Further, the processings EN1 to EN4 in FIG. 7A to FIG. 7D respectively indicate sixteen-round DES operation.

Figure 8:
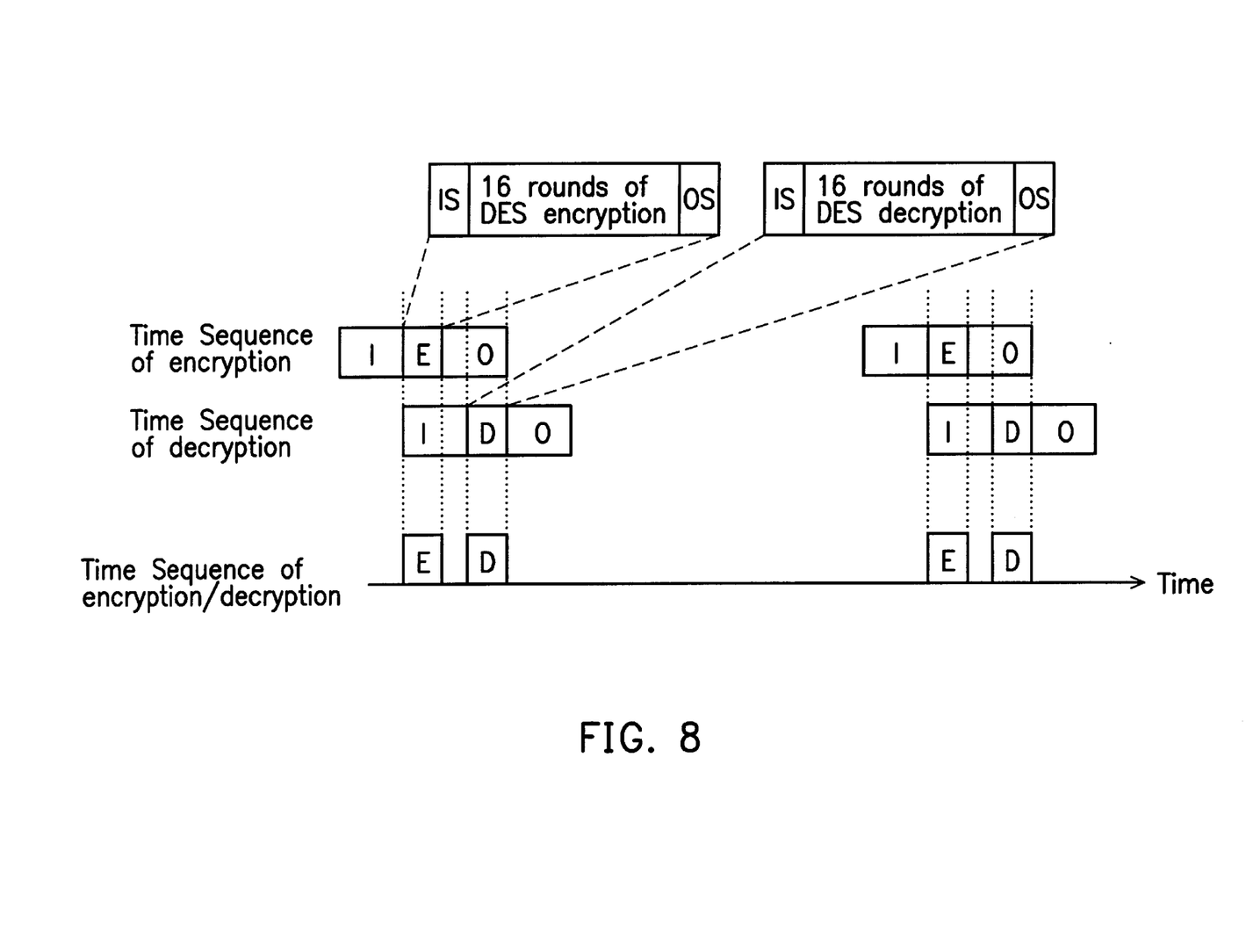
FIG. 8 is a schematic diagram illustrating the encryption-decryption time sequence in a full duplex DES algorithm unit according to the present invention.

Refer to FIG. 8, a schematic diagram illustrating the encryption-decryption time sequence of algorithm unit in the full duplex DES cipher processor of the present invention. The time sequences for the encryption and decryption operation are alternated but not overlapped; thus, the utilization efficiency for the entire DES cipher processor can be doubled without decreasing the speed of the encryption/decryption. In FIG. 8, the time sequence of a conventional encryption and a conventional decryption are idled for a long time for low transmission speed of the communication system. Therefore, the present invention provides an additional buffer. In this case, the interim encryption data is stored in the original buffer, and the interim decryption data is stored in the new provided buffer. Therefore, the utilization efficiency for the entire DES cipher processor can be doubled during the same period.

To summarize, the full duplex DES cipher processor of the present invention is capable of performing four contemporaneous DES encryption modes and decryption modes and reducing the cost and space. The crypto engine comprises two text buffers for storing the interim data during data encryption and data decryption. Therefore, the encryption operation and the decryption operation can be performed alternately to enhance the utilization efficiency by reducing the idling period of the algorithm unit.

It should be understood that the present invention is not limited to the preferred embodiment as disclosed above. Variations and modifications can be made by those who are skillful in the art without departing from the spirit and scope of the present invention as defined in the appended claims. By way of example, the number of rounds performed in the encryption and decryption processing can be increased or decreased as the user sees fit. Other changes will also suggest themselves to those skilled in this technology. Thus, this invention is not to be limited to the disclosed embodiment except as required by the appended claims.

What is claimed is:

1. A full duplex DES processor comprising an I/O unit receiving an input to be encrypted/decrypted, an IV/key storage unit, an algorithm unit and a control unit, wherein said algorithm unit comprises:

a key generation sub-unit for generating a plurality of subkeys;

a crypto engine comprising:

an input buffer for registering the input;

an n-round DES device for encrypting/decrypting the input registered in said input buffer according to said subkeys to generate a corresponding cipher text/plain text;

a cipher text buffer for storing the cipher text generated by said n-round DES device;

a plain text buffer for storing the plain text generated by said n-round DES device; and a first multiplexor and a second multiplexor, said first multiplexor selectively supplying the input registered in said input buffer or an output of said second multiplexor to said n-round DES device, and said second multiplexor selectively outputting the cipher text stored in said cipher text buffer or the plain text stored in said plain text buffer;

a mode selection sub-unit for processing the input to be encrypted/decrypted and the cipher text/plain text in said cipher text buffer/plain text buffer according to a selected encryption/decryption mode to obtain an encrypted/decrypted output for the next encryption/decryption; and an output multiplexor for selectively outputting the encrypted/decrypted output of said mode selection sub-unit or the cipher text/plain text of said cipher text buffer/plain text buffer according to said selected encryption/decryption mode.

2. The full duplex DES processor of claim 1, wherein said I/O unit further comprises:

a first port for receiving the input to be encrypted and for outputting the encrypted output; and a second port for receiving the input to be decrypted and for outputting the decrypted output.

3. The full duplex DES processor of claim 1, wherein said I/O unit further comprises a port for receiving the data to be encrypted/decrypted and for outputting the encrypted/decrypted output.

4. The full duplex DES processor of claim 1, wherein said I/O unit further comprises:

a first port for receiving the data to be encrypted/decrypted; and a second port for outputting the encrypted/decrypted output.

5. The full duplex DES processor of claim 1, wherein between the plain text and the cipher text, one is to be encrypted and the other is to be decrypted.

6. The full duplex DES processor of claim 1, wherein the DES processor can process the plain text and the cipher text, block by block, in an interleaving way, where the ciphered results of the previous plain text block are available to feed back as an initial vector for the encryption of the current plain text block, or the deciphered results of the previous cipher text block are available to feed back as an initial vector for the decryption of the current cipher text block.

* * * * *